United States Patent
Bui

(10) Patent No.: US 9,386,560 B2
(45) Date of Patent: *Jul. 5, 2016

(54) TRANSMISSION OF MBMS IN AN OFDM COMMUNICATION SYSTEM

(71) Applicant: LENOVO INNOVATIONS LIMITED (HONG KONG), Quarry Bay, Hong Kong (HK)

(72) Inventor: Thanh Bui, Yokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,998

(22) Filed: Jul. 23, 2014

(65) Prior Publication Data

US 2015/0016329 A1    Jan. 15, 2015

Related U.S. Application Data

(63) Continuation of application No. 13/784,347, filed on Mar. 4, 2013, now Pat. No. 8,837,376, which is a continuation of application No. 12/522,236, filed on Jul. 6, 2009, now Pat. No. 8,416,749.

(30) Foreign Application Priority Data

Jan. 10, 2007  (AU) ................................. 2007900103
Dec. 12, 2007  (WO) .................. PCT/JP2007/074367

(51) Int. Cl.
*H04W 4/00*    (2009.01)
*H04W 72/00*   (2009.01)
*H04L 5/00*    (2006.01)
(Continued)

(52) U.S. Cl.
CPC ........... *H04W 72/005* (2013.01); *H04L 5/0007* (2013.01); *H04L 27/2607* (2013.01); *H04L 27/2627* (2013.01); *H04L 27/2666* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 4,876,522 A | 10/1989 | Mitlmeier et al. | |
| 7,362,832 B2 | 4/2008 | Yoshida | |
| 7,542,411 B1 | 6/2009 | Goh et al. | |

(Continued)

FOREIGN PATENT DOCUMENTS

| | | | |
|---|---|---|---|
| EP | 1 418 720 A1 | 5/2004 | |
| EP | 1492249 A1 | 12/2004 | |

(Continued)

OTHER PUBLICATIONS

Japanese Office Action dated Jun. 6, 2012 issued by the Japanese Patent Office in counterpart Japanese Patent Application No. 2009-525823.

(Continued)

*Primary Examiner* — Kodzovi Acolatse

(57) ABSTRACT

The invention provides for a method of identifying a cyclic prefix to UEs in an OFDM communication system. The cyclic prefix has a dynamically variable length. The method includes, within an OFDM cell, transmitting MCCH scheduling information in a system information block in an OFDM broadcast channel, and using the MCCH scheduling information to receive the MCCH, wherein the MCCH contains MTCH scheduling information to indicate to the UE which sub-frame carries MTCH.

19 Claims, 12 Drawing Sheets

(51) Int. Cl.
*H04L 27/26* (2006.01)
*H04W 72/04* (2009.01)

(56) References Cited

U.S. PATENT DOCUMENTS

| | | | |
|---|---|---|---|
| 7,813,261 | B2 | 10/2010 | Ma et al. |
| 7,865,153 | B2 | 1/2011 | Khan et al. |
| 8,416,749 | B2 | 4/2013 | Bui |
| 2004/0091057 | A1 | 5/2004 | Yoshida |
| 2006/0067206 | A1* | 3/2006 | Mantravadi et al. .......... 370/208 |
| 2006/0176966 | A1 | 8/2006 | Stewart et al. |
| 2007/0091787 | A1 | 4/2007 | Kwon et al. |
| 2007/0104151 | A1 | 5/2007 | Papasakellariou et al. |
| 2009/0016254 | A1 | 1/2009 | Lee et al. |
| 2009/0028258 | A1* | 1/2009 | Ma et al. ................. 375/260 |
| 2009/0131037 | A1 | 5/2009 | Malladi et al. |
| 2009/0245399 | A1 | 10/2009 | Lee et al. |
| 2009/0296645 | A1 | 12/2009 | Bui |
| 2009/0316614 | A1 | 12/2009 | Kim et al. |

FOREIGN PATENT DOCUMENTS

| | | | |
|---|---|---|---|
| EP | 1892865 | A1 | 2/2008 |
| JP | 2004208254 | A | 7/2004 |
| JP | 2004-363891 | A | 12/2004 |
| JP | 2006-222956 | A | 8/2006 |
| JP | 5045970 | B2 | 10/2012 |
| JP | 5077592 | B2 | 11/2012 |
| WO | 2005/122517 | A1 | 12/2005 |
| WO | 2006039546 | A1 | 4/2006 |
| WO | 2006102746 | A1 | 10/2006 |
| WO | 2006134829 | A1 | 12/2006 |

OTHER PUBLICATIONS

Chinese Office Action dated May 31, 2012 issued by the State Intellectual Property Office of P. R. China in counterpart Chinese Patent Application No. 200780049679.1.

Office Action mailed Oct. 12, 2012 for corresponding U.S. Appl. No. 13/556,581.

Extended European Search Report, dated Nov. 14, 2012, issued by the European Patent Office in counterpart European Patent Application No. 07850846.2.

NEC Group, "Issue of dynamic CP length change in a cell with mixed unicast and MBMS transmission," 3GPP, R1-070357, RAN WG1 meeting 47bis, Sorrento, Italy, Jan. 15-19, 2007, 7 pages.

Office Action, dated Feb. 12, 2014, issued by the Japanese Patent Office, in counterpart Application No. 2013-033115.

"Further Consideration on Multiplexing of Unicast and MBMS", Huawei, 3GPP TSG RAN WG1 Meeting #44, Denver, US, Feb. 13-17, 2006, 4 pages.

Office Action issued Mar. 20, 2014 in parent application No. 13784347.

Office Action issued in U.S. Appl. No. 13/432,946 dated Mar. 4, 2013.

* cited by examiner

TRANSMISSION OF MBMS IN AN OFDM COMMUNICATION SYSTEM

This application is a Rule 53(b) continuation of U.S. application Ser. No. 13/784,347 filed Mar. 4, 2013, which is a continuation of Ser. No. 12/522,236 filed Jul. 6, 2009, which is a National Stage of International Application No. PCT/JP/2007/074367, filed Dec. 12, 2007, which claims priority from Australian Patent Application No. 2007900103, filed on Jan. 10, 2007, the disclosures of which are incorporated herein by reference in their entirety.

TECHNICAL FIELD

The present invention relates generally to a mobile communication system supporting Orthogonal Frequency Division Multiplexing, and in particular to mobile communication systems supporting proposed Multimedia Broadcast/Multicast Services.

BACKGROUND ART

As communication technology develops, services provided in mobile communication systems are evolving to include a multimedia broadcast communication service capable of supporting multimedia packet services to enable the transmission of large amounts of bulk data simultaneously to many User Equipment (UE). In order to support the multicast broadcast communication the 3$^{rd}$ Generation Partnership Project (3GPP) has been proposed a Multimedia Broadcast/Multicast Service (MBMS) in which one or more multimedia data resources provide a service to a plurality of UE.

Proposed MBMS services can transmit the same multimedia data to a plurality of UEs through a wireless Orthogonal Frequency Division Multiplexing (OFDM) network. MBMS services will be able to save wireless transmission resources by allowing a plurality of UEs to share one radio channel. MBMS services are intended to support the transmission of such multimedia data, as real-time image and voice, still images and text.

The basic time unit for the transmission and multiplexing signals—including data, control and reference signals—in OFDM system is an OFDM symbol, which consists of a cyclic prefix (CP) followed by an useful OFDM symbol. The useful OFDM symbol is the sum of multiple sub-carriers, each capable of carrying one modulation symbol which is referred to as a resource element (RE) in current 3GPP standards. An RE is basic frequency unit for signal transmission and multiplexing in OFDM system.

Current 3GPP standards specify normal and extended CP lengths for attaching to the useful OFDM symbol to avoid multipath interference at the UE. An OFDM symbol with a normal-length CP (OFSN) can be used for transmitting a signal requiring small or medium coverage to minimize CP overhead. An OFDM symbol with an extended-length CP (OFSE) can be used for transmitting a signal which requires large coverage to avoid multipath interference at a geographically remote UE.

When MBMS services are delivered to a single frequency network (SFN) MBMS service delivery area, the same MBMS signal is transmitted synchronously in time, using the same frequency sub-carriers, from within all cells in the MBMS service delivery area. Since an MBMS signal has a large coverage area, including multiple cells, OFSE is normally required for transmitting the MBMS signal.

3GPP normally use the term "unicast signal" to distinguish the cell specific signal (i.e. the signal that is generally different between the cells) and "MBMS signal" which can be the same from multiple cells. The CP length that is normally used for unicast signal transmission in a cell is called default CP of that cell.

3GPP standards define a transmission unit called slot which has length of 0.5 ms and consist of 7 OFSNs or 6 OFSEs. A sub-frame, consists of 2 slots, is currently assume to be smallest scheduling unit for transmission and multiplexing of unicast and MBMS signal at the physical layer. A slot or sub-frame can be viewed as a two dimensions grid (time and frequency) of multiple RE.

3GPP standards also assume that some types of Unicast signals, such as the L1/L2 control for Uplink (UL) scheduling, ACK for UL package transmission, Reference Signal for measurement, data for broadcast channel and paging channel, synchronisation signal, etc., need to be multiplexed with the MBMS signal in the same sub-frame. However, it is unclear how this multiplexing is done. 3GPP standards seem to assume that RE of some types of unicast (e.g. reference signal) and MBMS signals may be multiplexed in the same OFSE. If this is the case, it may happen that in a cell with normal CP being the default CP, same types of unicast signal can be transmitted in either OFSN or OFSE at any time. Therefore, it is unclear how all UEs, receiving unicast signal, are to be made aware of the dynamic change of CP length, between those OFDM symbols in which only Unicast signals are transmitted and those OFDM symbols in which MBMS and Unicast signals are multiplexed, in order to enable UEs to detect the useful part of a OFDM symbol transmitted after the normal or extended CP.

It would be desirable not to multiplex the MBMS signal and unicast signal in the same OFSE. If it is not possible, it would be desirable to provide a method of enabling a cyclic prefix length to be determined in an OFDM communication system in which the cyclic prefix length can vary dynamically. It would also be desirable to provide a method of enabling a cyclic prefix length to be determined in an OFDM communication system that ameliorates or overcomes one or more disadvantages or inconveniences of know cyclic prefix length determination methods.

DISCLOSURE OF INVENTION

With this in mind, one exemplary aspect of the invention provides a method of identifying a cyclic prefix to user equipments (UEs) in an orthogonal frequency division multiplexing (OFDM) communication system, the cyclic prefix having a dynamically variable length, the method including:

within an OFDM cell, transmitting MBMS control channel (MCCH) scheduling information in a system information block in an OFDM broadcast channel; and using the MCCH scheduling information to receive the MCCH, wherein the MCCH contains MBMS transport channel (MTCH) scheduling information to indicate to the UE which sub-frame carries MTCH.

BEST MODE FOR CARRYING OUT THE INVENTION

Exemplary embodiments of the present invention will now be described with reference to the attached drawings. It is to be understood that these embodiments are exemplary only and are not intended to limit the generality of the invention described previously.

Figure 1:
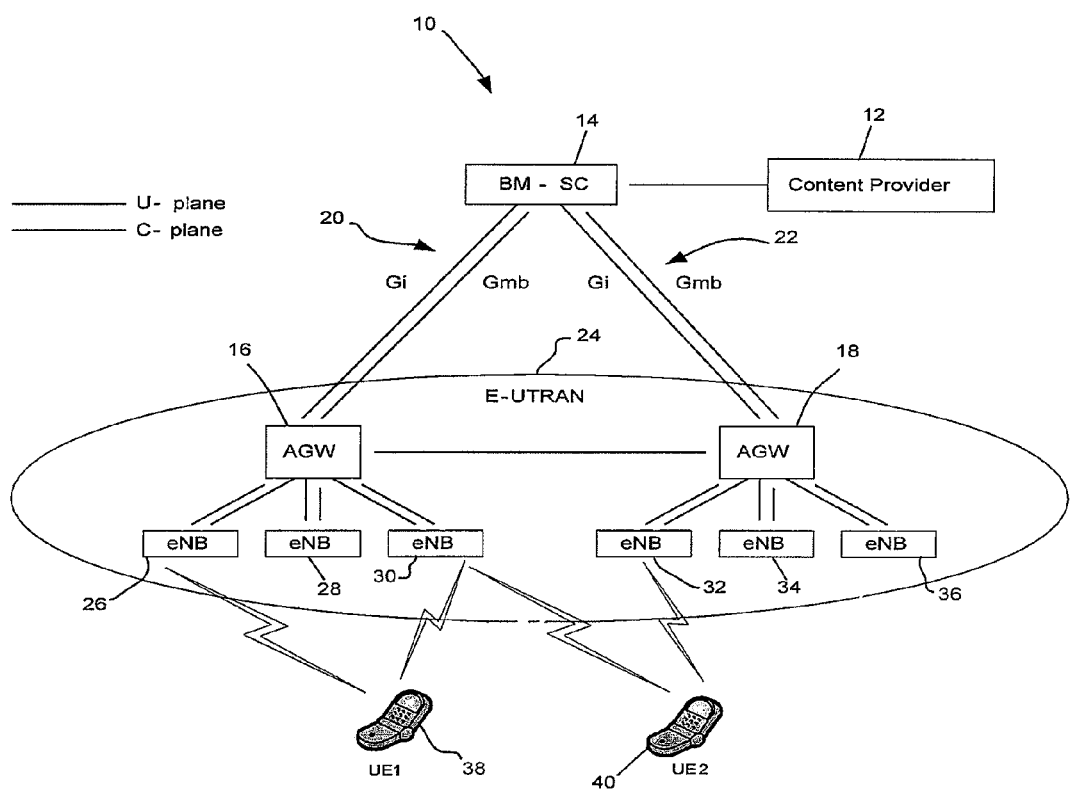
FIG. 1 is a schematic diagram of an OFDM communication system.

Referring now to FIG. 1, there is shown generally an OFDM communication network 10 for provision of MBMS services. A content provider 12 provides multimedia content to a Broadcast Multimedia Service Centre (BM-SC) 14. That multimedia content is transmitted to a plurality of Access Gateways (AGWs) 16 and 18 via communications interfaces 20 and 22. The AGWs 16 and 18 form part of an Evolved Universal Terrestrial Radio Access Network (E-UTRAN) 24. The AGWs 16 and 18 distribute the multimedia content to E-UTRAN nodes (eNBs) 26 to 36, each of which provides for radio transmission of the multimedia content within a separate cell. One or more cells defining a zone within which a same MBMS service is delivered is called an MBMS service delivery area. UEs 38 and 40 are able to received MBMS services within MBMS service delivery areas.

Figure 2:
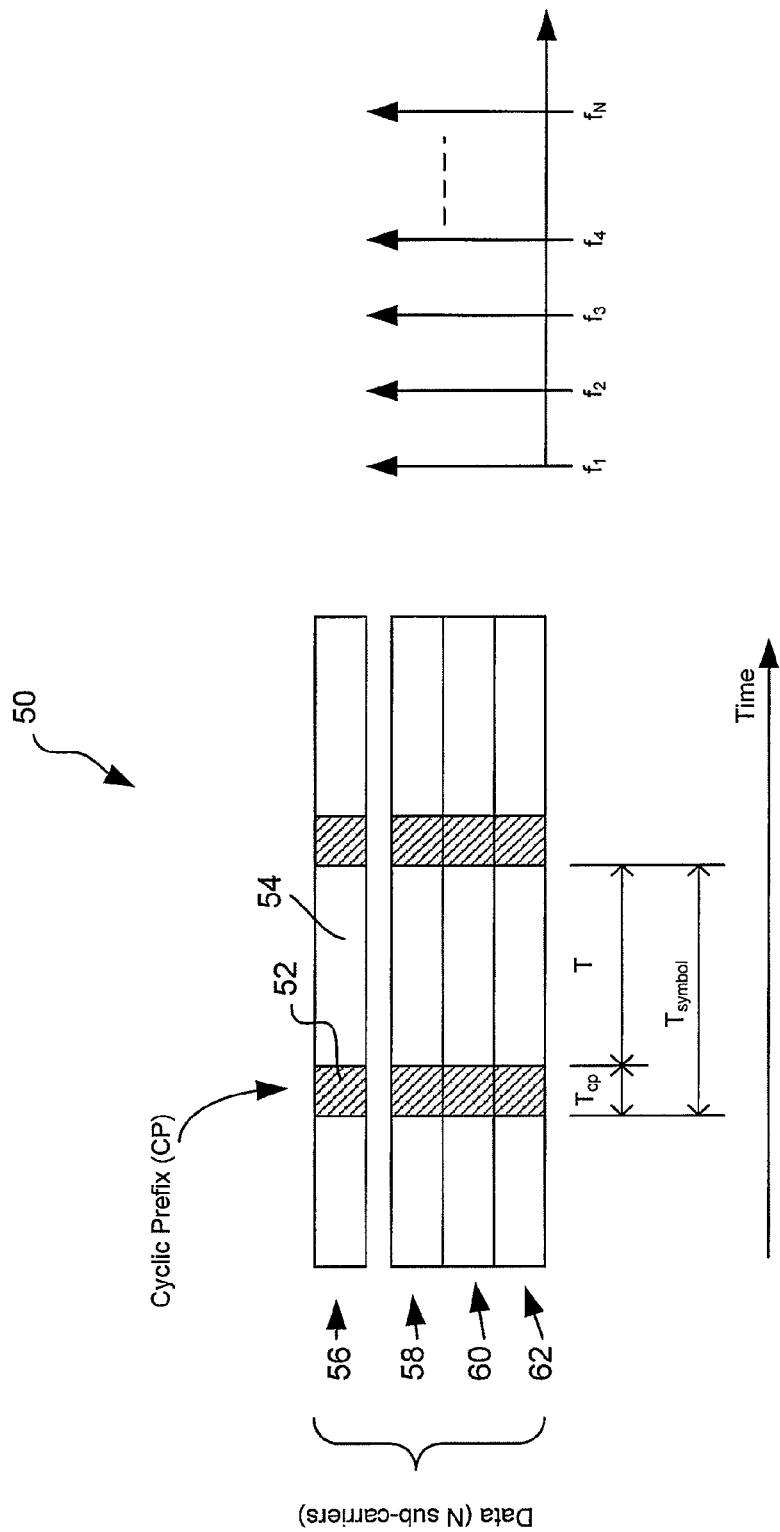
FIG. 2 is a schematic diagram illustrating the inclusion of a cyclic prefix in OFDM symbols transmitted in the OFDM communication system of FIG. 1.

Data is transmitted within the OFDM communication system 10 within a series of sub frames. Part of a representative sub-frame 50 is shown in FIG. 2. The sub-frame includes a series of OFDM symbols, with each OFDM symbol including a CP 52 and a useful part 54. Each OFDM symbol is a sum of series of sub-carriers, exemplary ones of which are referenced 56, 58, 60 and 62. The temporal length $T_{symbol}$ of the entire OFDM symbol equals the sum of the temporal length $T_{CP}$ of the CP plus the temporal length T of the useful OFDM symbol.

The CP is included in each OFDM symbol in order to maintain orthogonality between sub-carriers. The CP is a copy of the last portion of the useful part of the OFDM symbol appended to the front part of the symbol during a guard interval. Multiple path transmission of the OFDM symbol on the sub-carriers 56 to 62 causes tones and delayed replicas of tones to arrive at the UEs with some delay spread. This leads to a misalignment and loss of orthogonality between the tones. The CP allows the tones to be realigned at the UEs, thus regaining orthogonality. The CP length is chosen to eliminate inter-signal interference since the amount of time dispersion from the channel is smaller than the duration of the CP. Although the amount of the overhead increases as the CP gets longer, the CP must nevertheless be long enough to account for the anticipated multipath delay spread experienced by the system.

Figure 3:
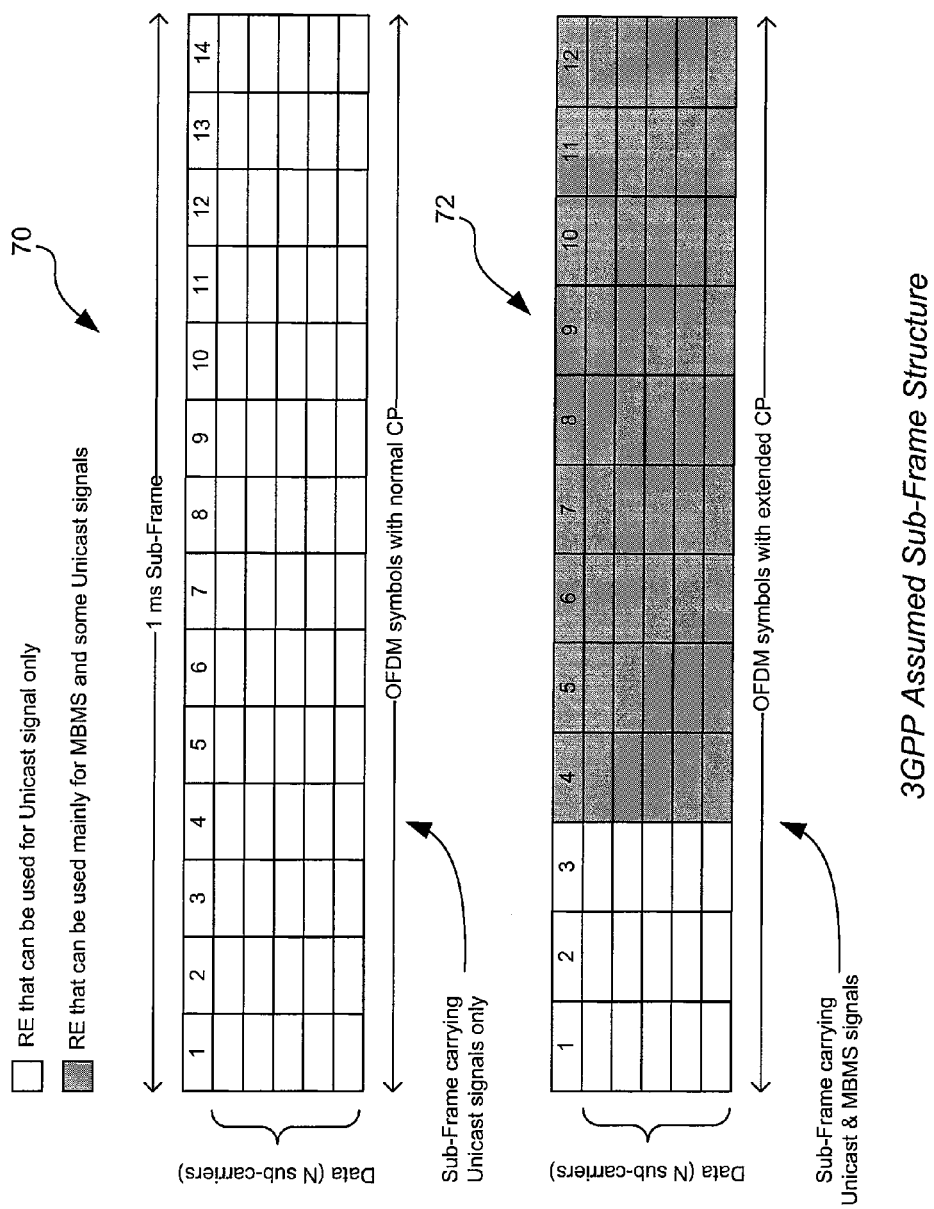
FIG. 3 is a schematic diagram showing a sub frame structure for use with the OFDM communication system in FIG. 1.

FIG. 3 is a schematic diagram showing sub-frame structures that are currently proposed by the 3GPP standardisation group. A first sub-frame structure 70 includes 14 OFDM symbols transmitted on a plurality of sub-carriers. The single data symbol transmitted by each sub-carrier during each OFDM symbol is known as a resource element (RE). The sub-frame structure 70 is intended to carry Unicast signals only and include a CP of normal length.

However, the sub frame 72 has also been proposed to carry both Unicast and MBMS signals which are multiplexed in a same sub-frame. The sub frame structure 72 is transmitted over the same length of time as the sub-frame structure 70 (namely, 1 ms). However, since MBMS services can be received at the UEs from relatively distant cells, each symbol in the sub-frame structure 72 is required to include a CP of extended length to ensure that the received MBMS signal is not impacted by multi-path interference. By way of example, a normal-length CP may have a length of 10 data samples in a 1.25 MHz bandwidth system whereas an extended length CP may have a length of 32 data samples in a 1.25 MHz bandwidth system. REs forming part of the first three symbols of the sub-frame structure 72 are defined in the current 3GPP standards as being for use with Unicast signals only, whereas REs forming part of the remaining nine symbols of the sub-frame structure 72 are defined as being able to carry both Unicast and MBMS signals.

However, it is not yet known how all UEs receiving Unicast signals from a cell for data reception and/or measurement purposes are to be made aware of a possible dynamic change of CP length for received sub-frames. This problem occurs, for example, when the default CP length within a particular cell is a normal-length CP but the cell also forms part of a MBMS service delivery area which requires an extended-length CP to be used during the transmission of all symbols carrying MBMS data. UEs currently have no way of knowing whether the CP length of the OFDM symbols in any given sub-frame is normal or extended.

In order for a UE to be able to determine whether a CP transmitted in any given OFDM sub-frame has a normal length or extended length, an MBMS control or scheduling channel (MCCH or MSCH) can be designed so that UEs can read information from the MCCH or MSCH characterising which sub-frame in an MBMS transport channel (MTCH) contains MBMS data (and therefore uses an extended-length CP).

Figure 4:
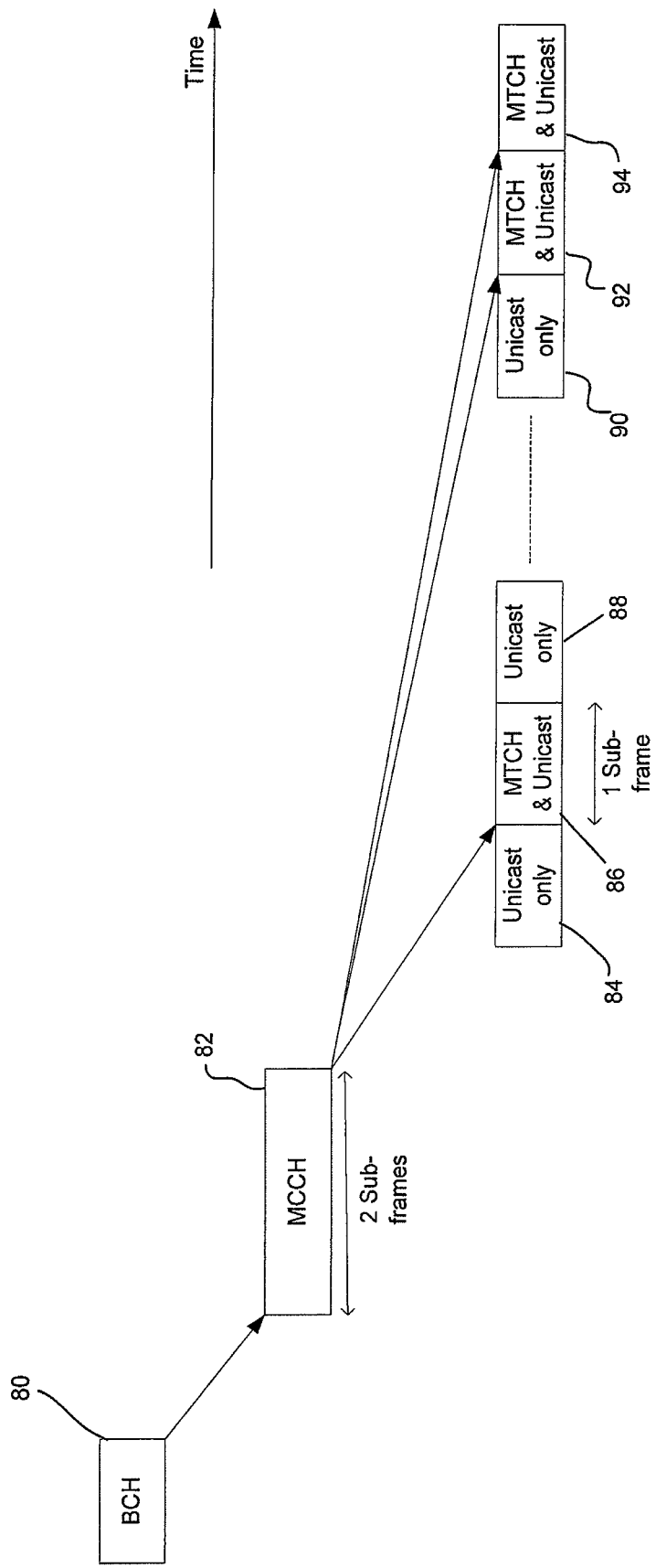
FIG. 4 is a schematic diagram showing the interrelationship between various channels used for transmission of information in the OFDM communication system of FIG. 1.

As can be seen in FIG. 4, a special system information block (SIB) 80 can be included in a conventional OFDM cell specific Broadcast Channel (BCH) to indicate to the UEs the location of information transmitted in an MBMS Control (Signalling) Channel (MCCH) 82 which identifies which sub-frame will carry MTCH and thus the length of the CP used in the sub-frames within an MBMS service delivery area. Exemplary sub-frames 84 to 94 are shown in FIG. 4. Sub-frames 84, 86 and 90 include Unicast symbols only and hence use a normal length CP, whilst sub-frames 86, 92 and 94 multiplex both MBMS and Unicast symbols and use an extended length CP.

Advantageously, no additional complexity is required for UE Physical Layer processing is required in this scenario, although UE must be able to receive not only the OFDM cell specific BCH but also the MBMS MCCH regardless of whether a particular UE wishes to receive an MBMS service.

Figure 10:
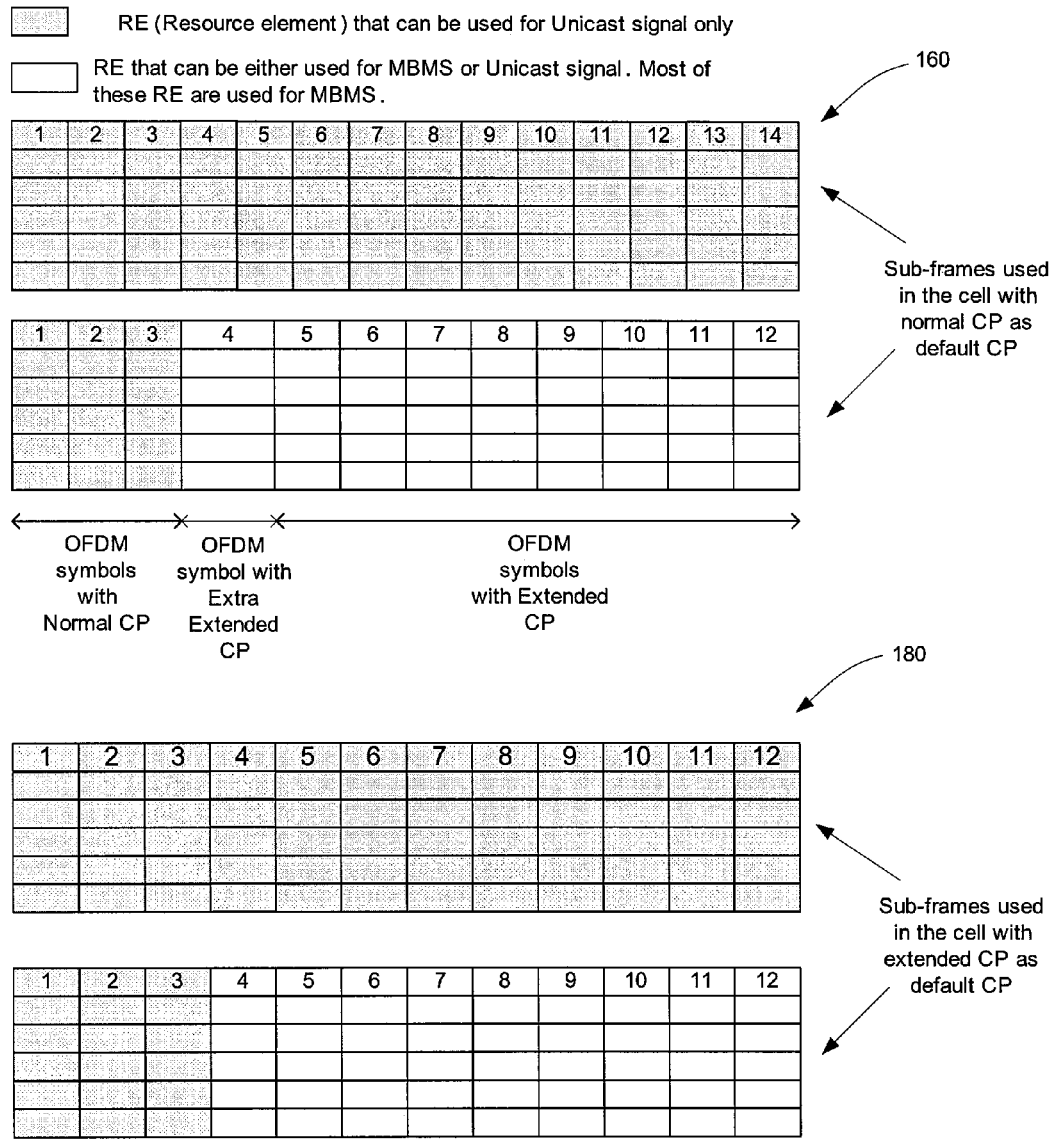
FIG. 10 is a schematic diagram showing an alternate sub frame structure for use with the OFDM communication system in FIG. 1.

An alternative to the above-described techniques is illustrated in FIG. 10. This figure shows a first new sub-frame structure 160 and a second new sub-frame structure 180 for use when MBMS and Unicast signals are multiplexed in the same sub-frame and transmitted from a cell with normal-length and extended-length CP, as default CP, respectively. In the new sub-frame 160, the first n (typically 2 or 3) OFDM symbols 162 always use a normal-length CP for transmitting Unicast signals only (i.e. mainly L1/L2 control for UL, RS and ACK) and the remaining OFDM symbols 164 use an extended-length CP for transmitting mainly MBMS signals.

In the new sub-frame 180, the first n (typically 2 or 3) OFDM symbols 182 always use a extended-length CP for transmitting Unicast signals only (i.e. mainly L1/L2 control for UL, RS and ACK) and the remaining OFDM symbols 184 use an extended-length CP for transmitting mainly MBMS signals.

The new sub-frames 160 and 180 should be such that the number of OFDM symbols used for MBMS must be the same and each of these symbols must end at the same time.

Advantageously such a new sub-frame structure 160 enables the UE to receive the L1/L2 control transmitted in the first n OFDM symbols in a sub-frame without being required to know if the MBMS signal is transmitted in the sub-frame or not since the first n OFDM symbols always use a normal-length CP. Moreover, if the UE only uses the RS in the 1$^{st}$ OFDM symbol in a slot (there are two slots in a sub-frame) for measurement, then UE does not need to be aware of whether MBMS is being transmitted in the sub-frame or not. If the sub-frame carrying the BCH always use default CP length then UE does not need to be aware of whether MBMS is being transmitted in the sub-frame or not.

Figure 5:
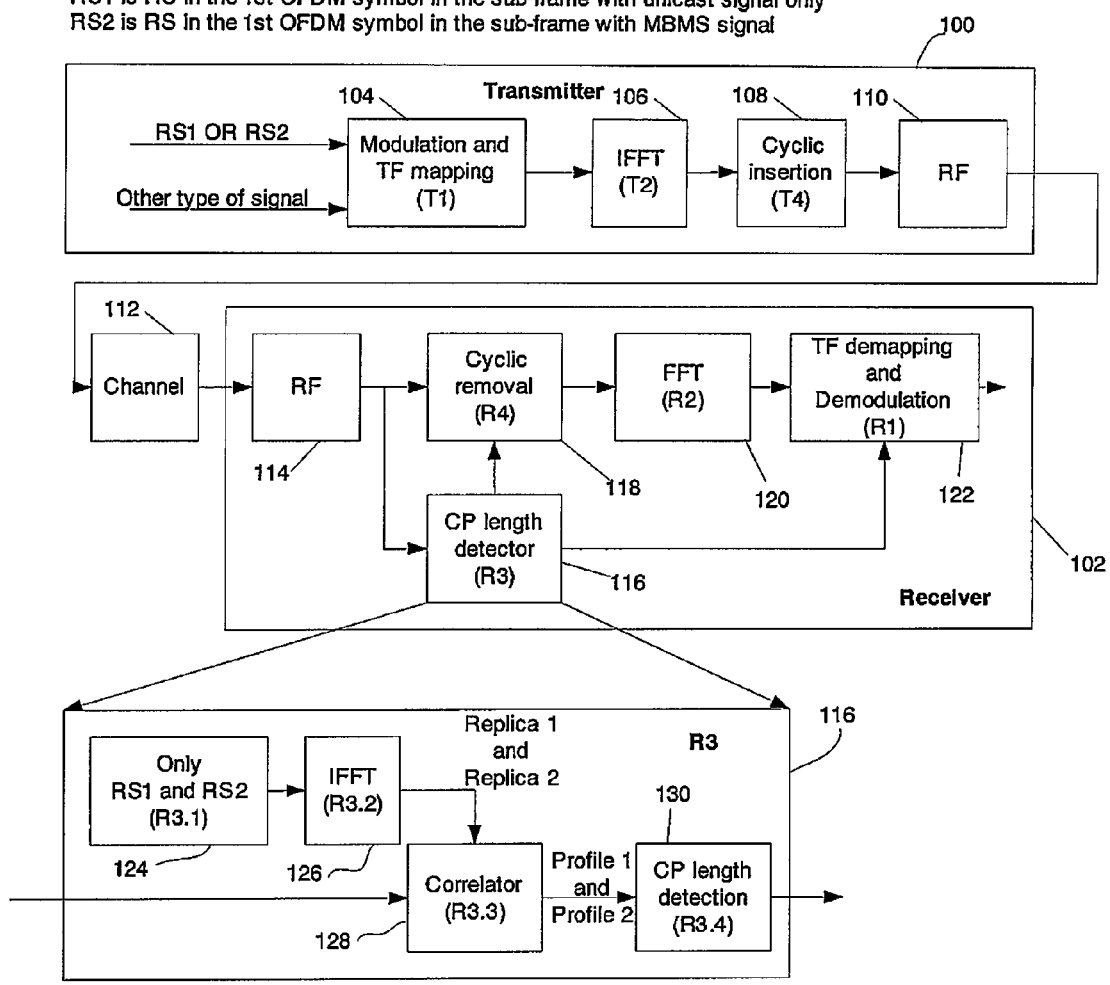
FIG. 5 is a schematic diagram illustrating selected functional components of an exemplary transmitter and UE forming part of the OFDM communication system of FIG. 1.

As another alternative to the above described technique, or as a compliment thereto when the UE misses or cannot read the MCCH and UE still need to know the CP length used in all OFDM symbols of a sub-frame, the UE can perform blind detection of the CP length. This alternative is only required when the UE receives a unicast signal from a cell with normal-length CP as default. FIG. 5 is a schematic diagram showing selected functional blocks of a transmitter 100 and receiver (UE) 102 in which CP length blind detection is performed. Following modulation and time/frequency mapping in block 104, an Inverse Past Fourier Transform (IFFT) is performed in the transmitter at IFFT block 106 in order to transform frequency domain data into the time domain signal. CP insertion block 108 is then used to introduce the cyclic prefix into OFDM symbols in order to avoid inter-symbol interference at the UE and RF block 110 is then used to transmit the signal over channel 112.

At the UE 102, a corresponding RF block 114 is used to receive and digitise the signal transmitted over the channel 112. A CP length detection block 116 then detects the length of the CP used in a given OFDM sub-frame. Thereafter, the CP is eliminated by CP removal block 118 and the useful part of the OFTM symbol is converted from the time domain into the frequency domain by FFT block 120, prior to time/frequency de-mapping and demodulation by processing block 122.

The UE 102 uses a replica of a Reference Signal (RS) transmitted during the 1$^{st}$ symbol in an OFDM sub-frame for cross-correlation with a received signal output from the RF block 114. The replica RS is stored in memory 124 and output through an IFFT block 126 that is functionally identical to the IFFT block 106 in the transmitter 100. The output of the IFFT block 126 is correlated with the output of the RF block 114 by a correlator 128, and the length of the CP is detected by the CP detection block 130.

Figure 6:
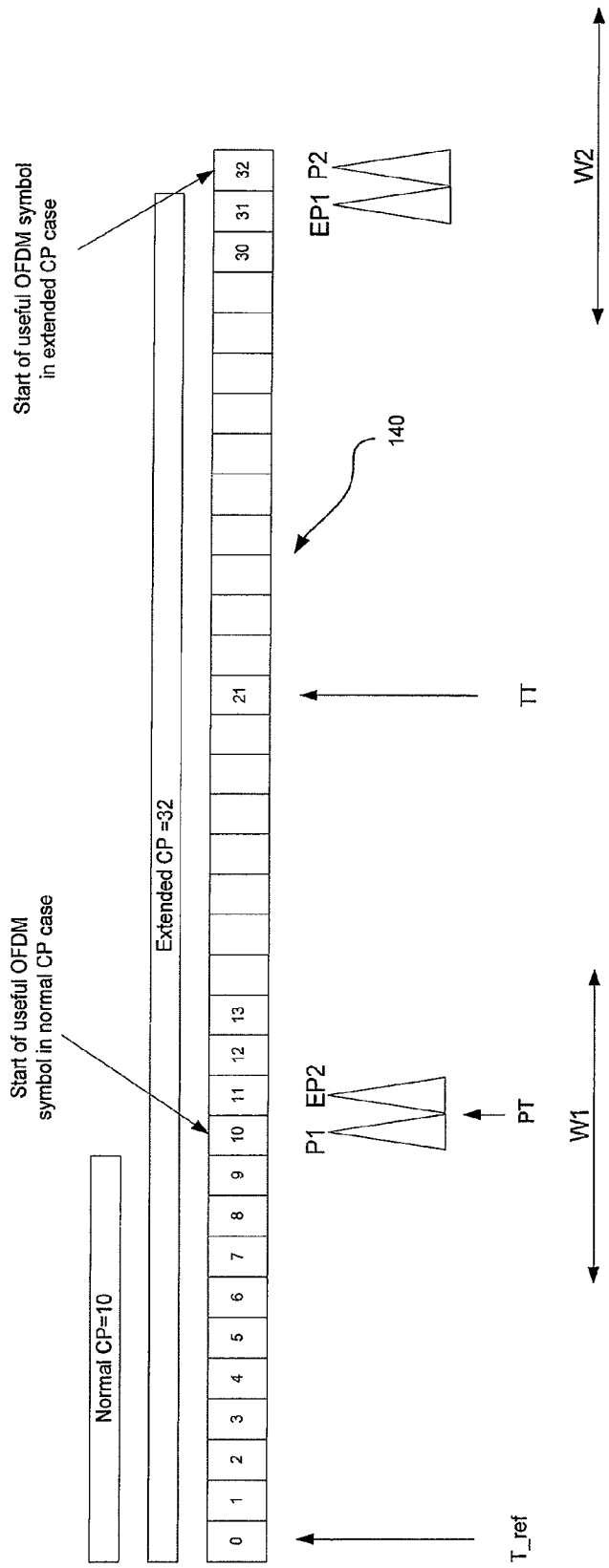
FIG. 6 is a timing diagram showing the temporal positions of correlation peak signals during operation of the OFDM communication system of FIG. 1.

FIG. 6 shows selected data samples in an exemplary 1$^{st}$ OFDM symbol in a sub-frame 140 as well as a first theoretical correlation peak P1 occurring at the start of the useful part of the OFDM symbol where a normal length CP is used, and a second theoretical correlation peak P2 occurring at the start of the useful part of the OFDM symbol where an extended length CP is used. If the UE 102 can always correctly estimate the temporal position T_ref of the start of each symbol, then the UE 102 simply needs to compare the two correlation values P1 and P2 in order to decide which CP length to use.

There is always error in estimations of the temporal position T_ref of the start of each symbol, and accordingly two windows W1 and W2 are required by the UE 102 within which to search for correlation signal peaks. The maximum window size MW is given by the difference in temporal positions between the peaks P1 and P2, which can be seen as the maximum margin of error for the estimation of the temporal position T_ref of the start of each sub-frame.

However, due to the fact that the temporal spacing between transmissions of RS is typically 6 sub-carriers, extra correlation peaks occur in the profile shown in FIG. 6. A first extra correlation peak EP1 resulting from use of a normal length CP, as well as a second extra correlation peak EP2 resulting from use of an extended length CP, are also shown in this figure. As can be seen in Table 1, depending up the bandwidth of the OFDM communication system, the correlation peak EP2 may be spaced from the correlation peak P1 (and correlation peak EP1 may be spaced from the correlation peak P2) by only 1 sample. This leaves a very small practical window PW to account for the T_ref estimation error.

TABLE 1

(Assuming T_ref = 0)

| System (MHz) | 1.25 | 2.5 | 5 | 10 | 15 | 20 |
| --- | --- | --- | --- | --- | --- | --- |
| P1 (sample position) | 10 | 20 | 40 | 80 | 120 | 160 |
| P2 (sample position) | 32 | 64 | 128 | 256 | 384 | 512 |
| MW = (P2 − P1) (no. of samples) | 22 | 44 | 88 | 176 | 264 | 352 |
| EP2 (sample position) | 11 | 22 | 43 | 86 | 128 | 171 |
| PW = (EP2 − P1) (no. of samples) | 1 | 2 | 3 | 6 | 8 | 11 |

Figure 7:
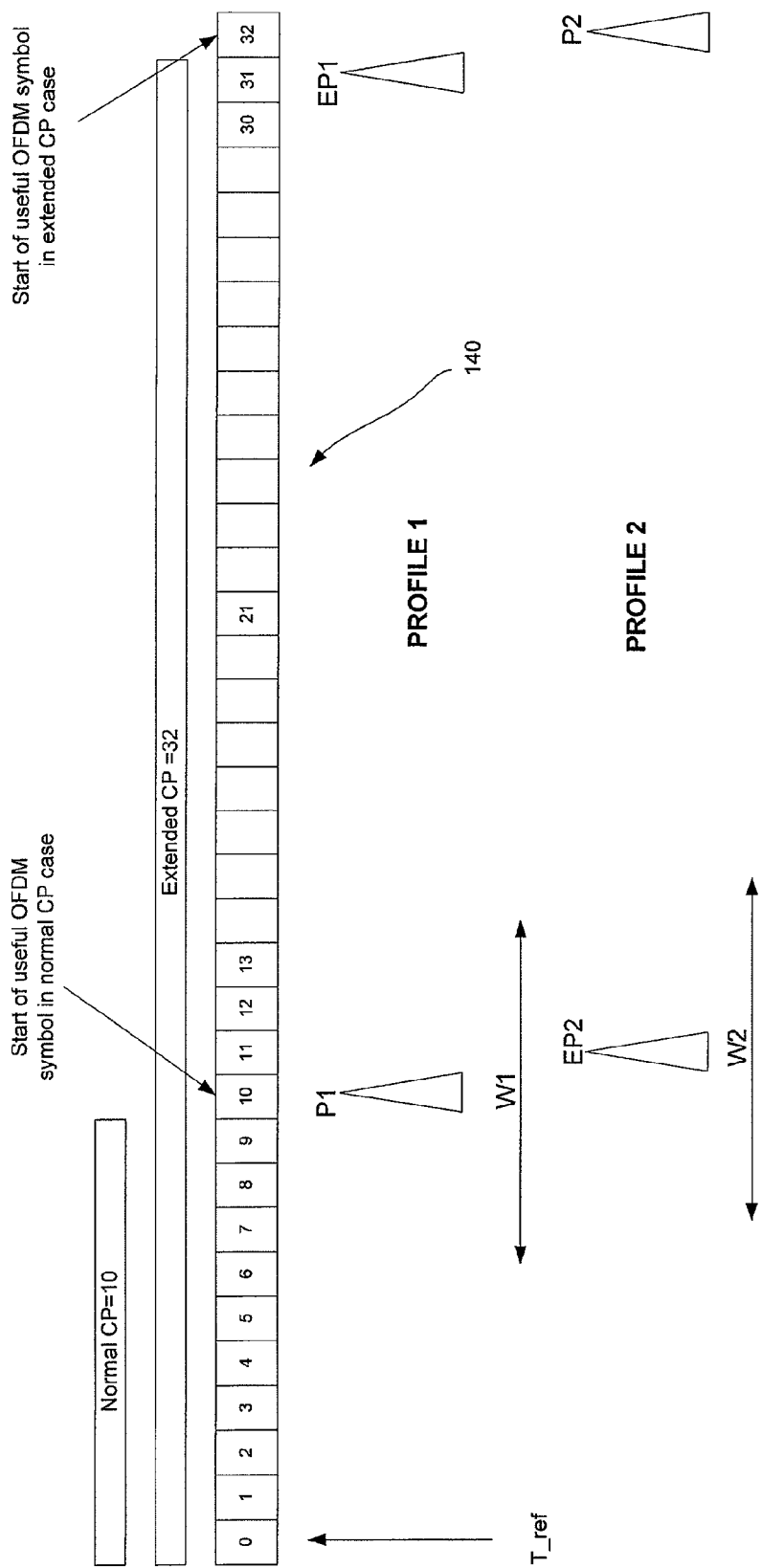
FIG. 7 is a timing diagrams showing the temporal positions of correlation peak signals during operation of the OFDM communication system of FIG. 1.

A first way of addressing this issue is to use to different RS sequences (referenced RS1 and RS2 in FIG. 5) in the 1$^{st}$ OFDM symbol in a sub-frame where an MBMS signal is able to be transmitted and where an MBMS signal is not able to be transmitted. As seen in FIG. 7, the UE 102 perform cross correlation of the received signal with each of the replica of RS1 and RS2 to generate two profiles. The CP length can then be determined from whichever of the two profiles has stronger correlation peak.

Figure 8:
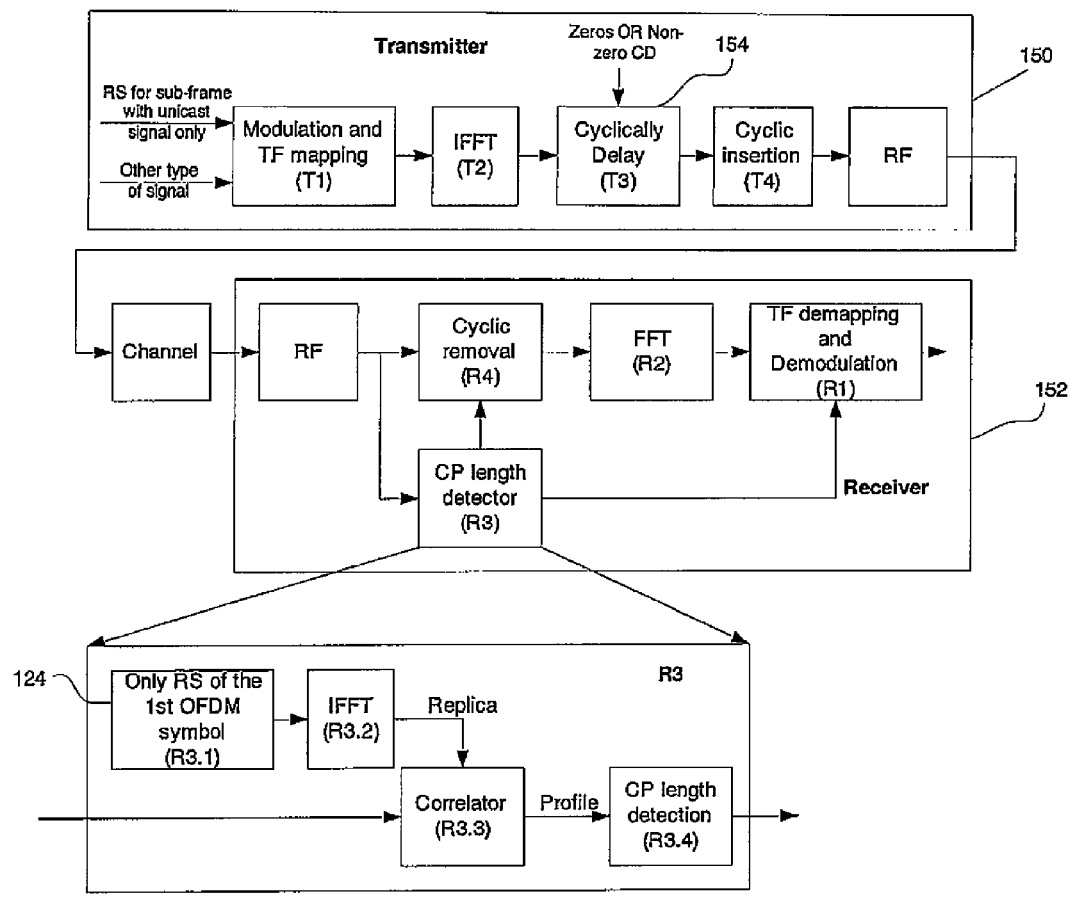
FIG. 8 is a schematic diagram illustrating selected functional components of an exemplary transmitter and UE forming part of the OFDM communication system of FIG. 1.

A second way of addressing this issue is to increase the distance between the correlation peaks P1 and EP2 (as well as the distance between EP1 and P2). One manner to achieve this separation is by applying a predefined non-zero cyclic delay (CD) to the OFDM symbols in the sub-frame where an MBMS signal is able to be transmitted and applying zero CD to the OFDM symbols in the sub-frame where an MBMS signal is not able to be transmitted. FIG. 8 is a schematic diagram showing selected functional blocks of a transmitter 150 and receiver (UE) 152 which are functionally identical to the transmitter 100 and receiver (UE) 102 shown in FIG. 5, except for the addition in the transmitter 150 of a CD insertion block 154 between the IFFT block 106 and the CP insertion block 108 and the storage of only a single RS sequence corresponding to the zero CD RS sequence in the memory block 124 of the UE 152.

In operation, the UE 152 performs one correlation using the zero CD RS sequence to generate a single correlation peak profile, and then determines the CP length based upon which window (i.e. either the window W1 centred on the beginning of the useful part of the OFDM symbol when a normal-length CP is used, or the window W2 centred at about CD samples from the centre of W1) has the strongest correlation peak.

Figure 9:
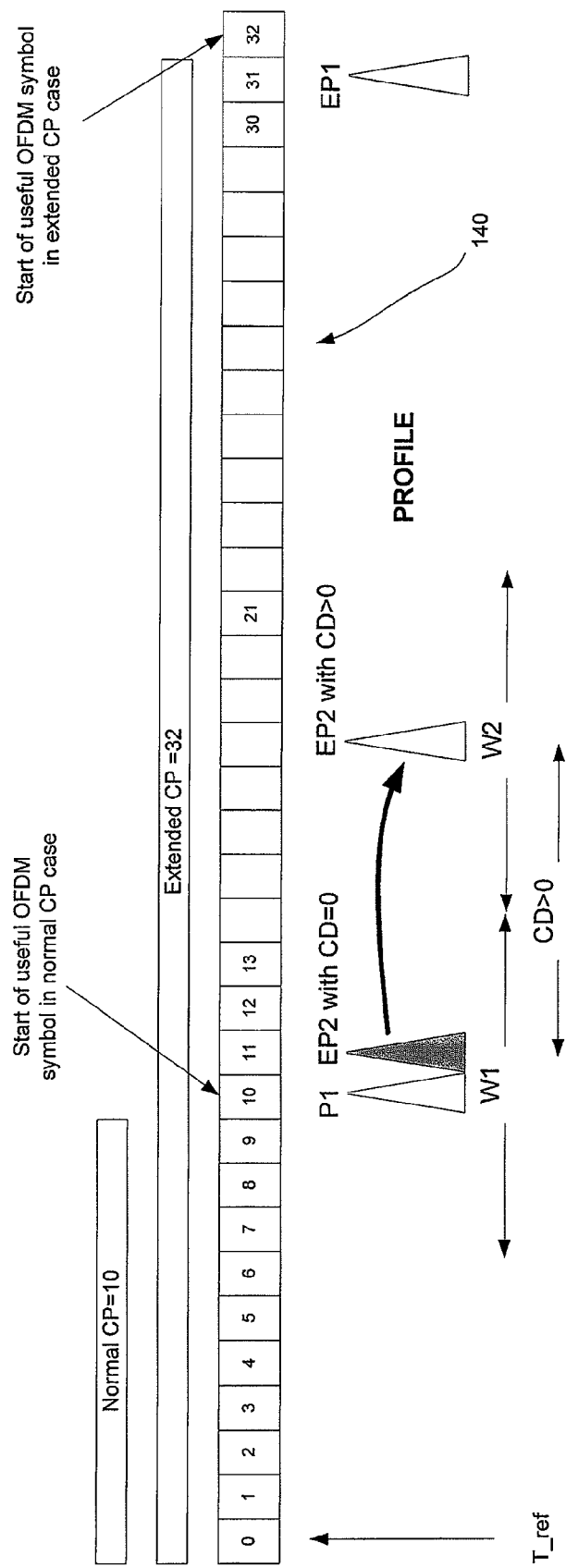
FIG. 9 is a timing diagram showing the temporal positions of correlation peak signals during operation of the OFDM communication system of FIG. 1.

As seen in FIG. 9, the effect of applying a predefined non-zero CD to the OFDM symbols in the sub-frame where an MBMS signal is transmitted and applying zero CD to the OFDM symbols in the sub-frame where an MBMS signal is not transmitted causes a separation of the correlation peaks P1 and EP2. In principle, in the sub-frame where an MBMS signal is transmitted, a non-zero CD only needs be applied on the RS in the 1$^{st}$ OFDM symbol. However, to simplify system implementation and to make CD more transparent to the UE, it may be desirable that non-zero CD be applied to all OFDM symbols in a given sub-frame.

Table 2 below shows an example where a non-zero CD is used. It can be seen that the practical window PW is significantly larger than in Table 1.

TABLE 2

| System, MHz | 1.25 | 2.5 | 5 | 10 | 15 | 20 |
|---|---|---|---|---|---|---|
| P1 | 10 | 20 | 40 | 80 | 120 | 160 |
| CD | 8 | 17 | 35 | 71 | 107 | 143 |
| EP2 | 19 | 39 | 78 | 157 | 235 | 314 |
| PW = (EP2 − P1) | 9 | 19 | 38 | 77 | 115 | 154 |

Yet another alternative to the above-described techniques provided by a combination of blind CP length detection, as described in relation to FIGS. 5 to 9, and the new sub-frame structure 160 shown in FIG. 10. In this alternative embodiment, the new sub-frame structure 160 is used for transmission of MBMS signals.

Figure 11:
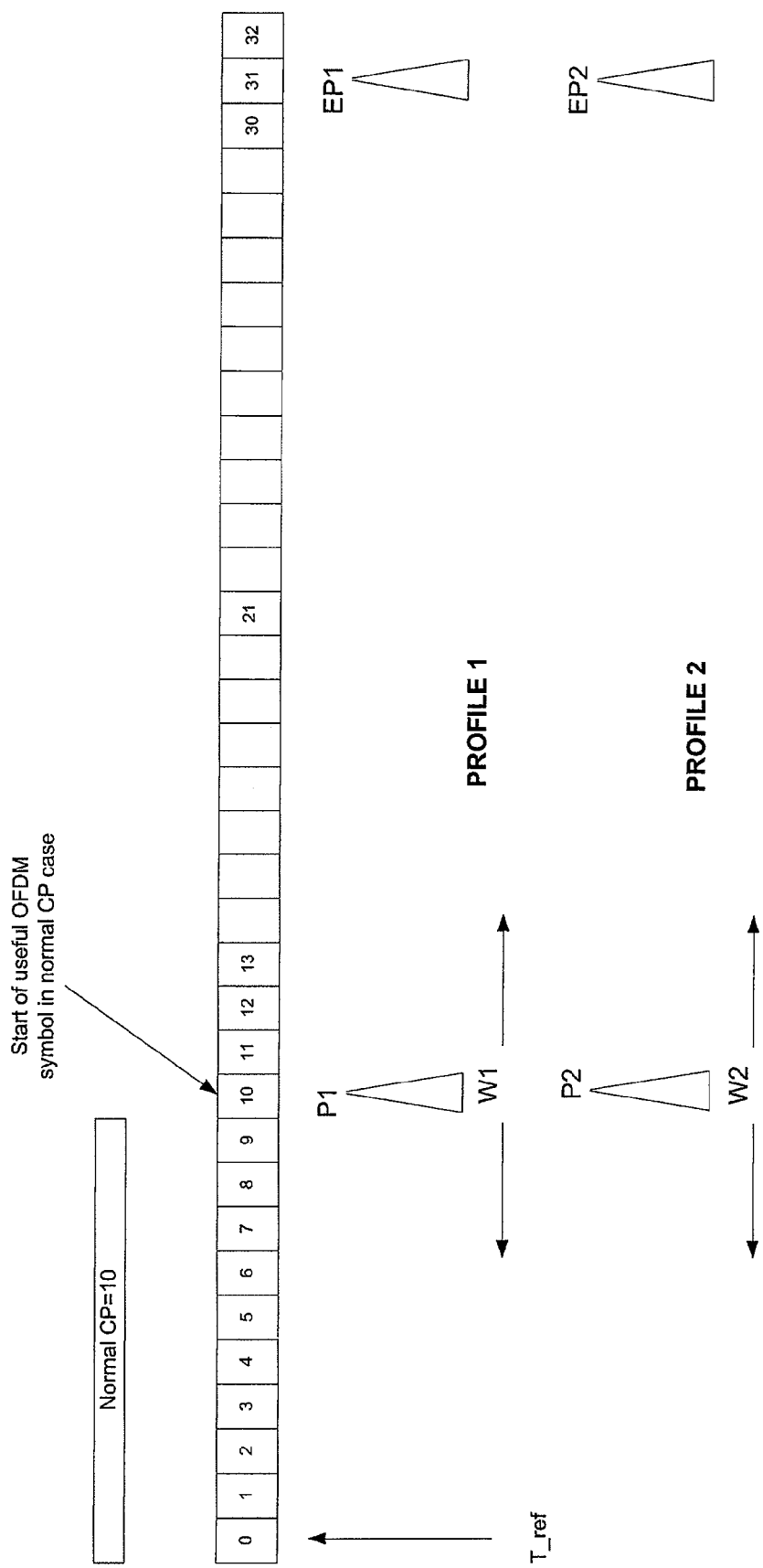
FIG. 11 is a timing diagram showing the temporal positions of correlation peak signals during operation of the OFDM communication system of FIG. 1.
Figure 12:
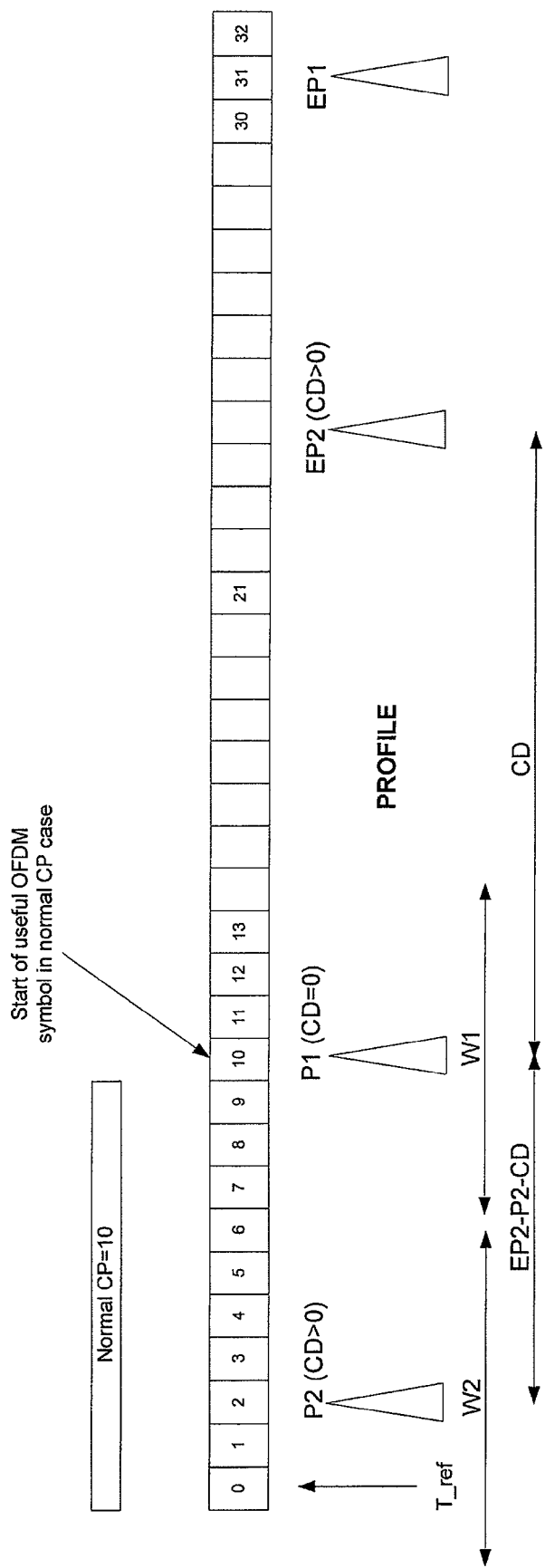
FIG. 12 is a timing diagram showing the temporal positions of correlation peak signals during operation of the OFDM communication system of FIG. 1.

Two variations exist for this alternative embodiment. In a first of these variations, two different RS sequences are used in the 1$^{st}$ OFDM symbols in the sub-frame where Unicast signals only are transmitted or where Unicast or MBMS signals are transmitted. In operation, the UE receives Unicast signals in the first n OFDM symbols knowing that a normal-length CP is used. During the 1$^{st}$ OFDM symbol, the UE detects which of the RS sequences is used as shown in FIG. 11. The UE then uses the detected RS for decoding of other Unicast data channel such as L1/L2 control channel.

In a second variation, the same RS sequence is used in the 1$^{st}$ OFDM symbols in the sub-frame where only Unicast signals or MBMS signals are transmitted. In the sub-frame where MBMS is transmitted, a CD will be set to a non-zero value during the first n OFDM symbols. In operation, the UE receives Unicast signals in the first n OFDM symbols knowing that a normal-length CP is used. The UE can decode other Unicast data channels such as L1/L2 control channel without any delay. During the 1$^{st}$ OFDM symbol, the UE detects if a zero CD or a non-zero CD has been applied to the RS as shown in 12.

In principle, in the sub-frame where MBMS signal is transmitted, a non-zero CD only need be applied on the RS in the 1$^{st}$ OFDM symbol. However, to simplify system implementation and to make cyclic delay transparent to the UE receiving L1/L2 control channel, it may be desirable that non-zero CD is applied to the first n OFDM symbols in the sub-frame.

These two variations advantageously enable the UE to receive L1/L2 control transmitted in the first n OFDM symbols in a sub-frame without being required to know if the MBMS signal is transmitted in the sub-frame or not. Moreover, the UE can detect the CP length used in n+1, n+2, . . . OFDM symbols. CP length detection at the UE involves no or negligible increase in delay of L1/L2 control channel decoding.

It is to be understood that modifications or additions may be made to the above described embodiments without departing from the spirit or ambit of the invention as defined in the claims appended hereto.

Another exemplary aspect of the invention provides a method of identifying a cyclic prefix length in an OFDM communication system, the cyclic prefix having a dynamically variable length, the method including:

correlating a stored replica of one or more reference signals able to be transmitted in the k-th OFDM symbol in a sub-frame with a received signal to generate one or more correlation profiles;

The k-th may be the first OFDM symbol in a sub-frame

In the case of only one correlation profile being generated, the method may further includes the steps of:

detecting a correlation signal peak temporally proximate a first possible beginning of a useful part of a hypothetical OFDM symbol should it include a normal-length cyclic prefix, and a second possible beginning of the useful part of the hypothetical OFDM symbol should it include an extended-length cyclic prefix; and determining the length of the cyclic prefix from the strength of the detected correlation peaks.

In one exemplary embodiment, a first reference signal is transmitted in a sub-frame carrying MBMS signals and a second reference signal is transmitted in a sub-frame not carrying MBMS signals, the first and second reference signals being different from each other, the method further including the steps of:

separately correlating stored replicas of the first and second reference signals with the received signal to respectively produce a first and a second correlation profile; and determining the cyclic prefix length from whichever of the first and second profiles results in the strongest correlation peaks.

In another exemplary embodiment, the method further includes:

processing the OFDM symbol prior to transmission to introduce a separation between the two possible correlation signal peaks.

The separation may be introduced by applying a non-zero cyclic delay to OFDM symbols in a sub-frame in which an extended-length cyclic prefix is used, and by applying zero cyclic delay to OFDM symbols in a sub-frame in which an extended-length cyclic prefix is not used.

Another exemplary aspect of the invention provides a method of identifying a cyclic prefix in an OFDM communication system, the cyclic prefix having a dynamically variable length, the method including:

within an OFDM cell, transmitting MCCH scheduling information scheduling information in a system information block in an OFDM broadcast channel; and using the MCCH scheduling information to receive the MCCH, wherein the MCCH contains MTCH scheduling information to indicate to the UE which sub-frame carries MTCH; and where the MBMS point-to-multipoint control channel is missed or unable to be read, correlating a stored replica of one or more reference signals able to be transmitted in an OFDM symbol with a received signal;

detecting a correlation signal peak temporally proximate a first possible beginning of a useful part of a hypothetical OFDM symbol should it include a normal-length cyclic prefix, and a second possible beginning of the useful part of the hypothetical OFDM symbol should it include an extended-length cyclic prefix; and determining the length of the cyclic prefix from the strength of the detected correlation peaks.

Another exemplary aspect of the invention provides a method of OFDM data transmission in a sub-frame of m OFDM symbols in which the cyclic prefix length of each symbol can vary dynamically, the method including the steps of:

including a normal-length cyclic prefix in a first n OFDM symbols in a sub-frame, n being an integer having a value less m, and including an extended-length cyclic prefix in the remaining m-n OFDM symbols, wherein MBMS signals are transmitted in the remaining m-n OFDM symbols.

The value of n may be 3 or less.

Another exemplary aspect of the invention provides a method of cyclic prefix length detection in which data is transmitted as described above, the method of cyclic prefix length detection including the step of:

correlating a stored replica of one or more reference signals able to be transmitted in the k-th OFDM symbol transmitted in a sub-frame with a received signal.

The k-th symbol may be the first OFDM symbol in a sub-frame

In one exemplary embodiment, a first reference signal is transmitted in a sub-frame carrying MBMS signals and a second reference signal is transmitted in a sub-frame not carrying MBMS signals, the first and second reference signals being different from each other, the method further including the steps of:

separately correlating stored replicas of the first and second reference signals with the received reference signal to respectively produce a first and a second correlation profile; and determining the length of the cyclic prefix used in the remaining m-n symbols from whichever of the first and second profiles results in the strongest correlation peaks.

In another exemplary embodiment, the method further includes the step of:

processing the first OFDM symbol prior to transmission to introduce a separation between the two possible correlation signal peaks.

The separation may be introduced by applying a non-zero cyclic delay to each of the first n OFDM symbols in a sub-frame in which an extended-length cyclic prefix is used, and by applying zero cyclic delay to each of the first n OFDM symbols in a sub-frame in which an extended-length cyclic prefix is not used.

This application is based upon and claims the benefit of priority from Australian patent application No. 2007900103, filed on Jan. 10, 2007, the disclosure of which is incorporated herein in its entirety by reference.

The invention claimed is:

1. A base station for orthogonal frequency division multiplexing (OFDM) data transmission in a plurality of sub-frames, the base station comprising:

a transmitter including a processor and a radio-frequency (RF) circuit configured to transmit a default cyclic prefix for each of first one or more OFDM symbols in each of the plurality of sub-frames, the number of said first one or more OFDM symbols being n having a value of 2 or greater and being less than m, and an extended-length cyclic prefix for remaining m-n OFDM symbols, wherein a multimedia broadcast multicast service (MBMS) signal is transmitted on the remaining m-n OFDM symbols, and wherein a length of the default cyclic prefix is less than a length of the extended-length cyclic prefix.

2. The base station according to claim 1, wherein a default cyclic prefix comprises a cyclic prefix that is used for a unicast signal.

3. The base station according to claim 1, wherein a cyclic prefix length for each OFDM symbol varies dynamically.

4. The base station according to claim 1 wherein the extended-length cyclic prefix is transmitted in a slot of the sub-frame in which the default cyclic prefix is transmitted.

5. A user equipment for orthogonal frequency division multiplexing (OFDM) data reception in a plurality of sub-frames, the user equipment comprising:

a receiver including a processor and a radio-frequency (RF) circuit configured to receive default cyclic prefix for each of first one or more OFDM symbols in each of the plurality of sub-frames, the number of said first one or more OFDM symbols being n having a value of 2 or greater and being less than m where m is a number of OFDM symbols in each of the plurality of sub-frames, wherein each of the plurality of sub-frames includes an extended-length cyclic prefix for remaining m-n OFDM symbols, wherein a multimedia broadcast multicast service (MBMS) signal is transmitted in the remaining m-n OFDM symbols, and wherein a length of the default cyclic prefix is less than the length of the extended-length cyclic prefix.

6. The user equipment according to claim 5, wherein a cyclic prefix length for each OFDM symbol varies dynamically.

7. The user equipment according to claim 5 wherein the extended-length cyclic prefix is received in a slot of the sub-frame in which the default cyclic prefix is received.

8. A communications system for orthogonal frequency division multiplexing (OFDM) data transmission in a plurality of sub-frames, the communications system comprising:

a user equipment;

a base station comprising a transmitter which transmits, to the user equipment, a default cyclic prefix for each of first one or more OFDM symbols in each of the plurality of sub-frames, the number of said first one or more OFDM symbols being n having a value of 2 or greater and being less than m where m is a number of OFDM symbols in each of the plurality of sub-frames, and an extended-length cyclic prefix for the remaining m-n OFDM symbols, wherein a multimedia broadcast multicast service (MBMS) signal is transmitted in the remaining m-n OFDM symbols, and wherein a length of the default cyclic prefix is less than the length of the extended-length cyclic prefix.

9. The communication system according to claim 8 wherein the extended-length cyclic prefix is transmitted in a slot of the sub-frame in which the default cyclic prefix is transmitted.

10. A communications method implemented in a base station of orthogonal frequency division multiplexing (OFDM) data transmission in a plurality of sub-frames, the communications method comprising:

transmitting, by a transmitter of the base station, a non-multimedia broadcast multicast service (non-MBMS) signal in first one or more OFDM symbols in each of the plurality of sub-frames, the number of said first one or more OFDM symbols being n having a value of 2 or greater and being less than m, where m is a number of OFDM symbols in each of the plurality of sub-frames, and a multimedia broadcast multicast service (MBMS) signal in remaining m-n OFDM symbols, wherein a default cyclic prefix is transmitted for the non-MBMS signal and an extended-length cyclic prefix is transmitted for the MBMS signal, and wherein a length of the default cyclic prefix is less then than a length of the extended-length cyclic prefix.

11. The communication method according to claim 10 wherein the extended-length cyclic prefix is transmitted in a slot of the sub-frame in which the non-MBMS signal is transmitted.

12. A communications method implemented in a user equipment of orthogonal frequency division multiplexing (OFDM) data reception in a plurality of sub-frames, the communications method comprising:

receiving, by a receiver of the user equipment, a non-multimedia broadcast multicast service (non-MBMS) signal in first one or more OFDM symbols in each of the plurality of sub-frames, the number of said first one or more OFDM symbols being n having a value of 2 or greater and being less than m, where m is a number of OFDM symbols in each of the plurality of sub-frames, wherein a multimedia broadcast multimedia service (MBMS) signal is transmitted in remaining m-n OFDM symbols, wherein a default cyclic prefix is transmitted for the non-MBMS signal and an extended-length cyclic prefix is transmitted for the MBMS signal, and wherein a length of the default cyclic prefix is less than a length of the extended-length cyclic prefix.

13. The communication method according to claim 12 wherein the MBMS signal is received in a slot of the sub-frame in which the non-MBMS signal is received.

14. A communications method implemented in a communications system of orthogonal frequency division multiplexing (OFDM) data transmission in a plurality of sub-frames, the communications method comprising:

transmitting, by a transmitter of the base station, a non-multimedia broadcast multicast service (non-MBMS) signal in first one or more OFDM symbols in each of the plurality of sub-frames, the number of said first one or more OFDM symbols being n having a value of 2 or greater and being less than m, where m is a number of OFDM symbols in each of the plurality of sub-frames, and a multimedia broadcast multicast service (MBMS) signal in remaining m-n OFDM symbols, wherein a default cyclic prefix is transmitted for the non-MBMS signal and an extended-length cyclic prefix is transmitted for the MBMS signal, and wherein a length of the default cyclic prefix is less then than a length of the extended-length cyclic prefix.

15. The communication method according to claim 14 wherein the MBMS signal is transmitted in a slot of the sub-frame in which the non-MBMS signal is transmitted.

16. A base station for orthogonal frequency division multiplexing (OFDM) data transmission in a sub-frame of m OFDM symbols, the base station comprising:

transmission means including a processor and a radio-frequency circuit to transmit a non-multimedia broadcast multicast service (non-MBMS) signal in first one or more OFDM symbols in each of the plurality of sub-frames, the number of said first one or more OFDM symbols being n having a value of 2 or greater and being less than m, where m is a number of OFDM symbols in each of the plurality of sub-frames, and a multimedia broadcast multicast service (MBMS) signal in remaining m-n OFDM symbols, wherein a default cyclic prefix is transmitted for the non-MBMS signal and an extended-length cyclic prefix is transmitted for the MBMS signal, and wherein a length of the default cyclic prefix is less then than a length of the extended-length cyclic prefix.

17. The base station according to claim 16 wherein the MBMS signal is transmitted in a slot of the sub-frame in which the default cyclic prefix is transmitted.

18. A user equipment for orthogonal frequency division multiplexing (OFDM) data reception in a sub-frame of m OFDM symbols, the user equipment comprising:

receiving means including a processor and a radio-frequency circuit to receive a non-multimedia broadcast multicast service (non-MBMS) signal in first one or more OFDM symbols in each of the plurality of sub-frames, the number of said first one or more OFDM symbols being n having a value of 2 or greater and being less than m, where m is a number of OFDM symbols in each of the plurality of sub-frames, wherein a multimedia broadcast multimedia service (MBMS) signal is transmitted in remaining m-n OFDM symbols, wherein a default cyclic prefix is transmitted for the non-MBMS signal and an extended-length cyclic prefix is transmitted for the MBMS signal, and wherein a length of the default cyclic prefix is less than a length of the extended-length cyclic prefix.

19. The user equipment according to claim 18 wherein the MBMS signal is received in a slot of the sub-frame in which the default cyclic prefix is received.

* * * * *